Dec. 6, 1960 D. L. WHITE 2,963,553

SYSTEM FOR IDENTIFYING TELEPHONE LINES

Filed March 17, 1954

INVENTOR:
Douglas L. White,
BY
Dawson, Tilton & Graham
ATTORNEYS 2,963,553

SYSTEM FOR IDENTIFYING TELEPHONE LINES

Douglas L. White, Chicago, Ill.
(250 E. 39th St., New York, N.Y.)

Filed Mar. 17, 1954, Ser. No. 416,787
10 Claims. (Cl. 179—18)

Figures 1, 3:
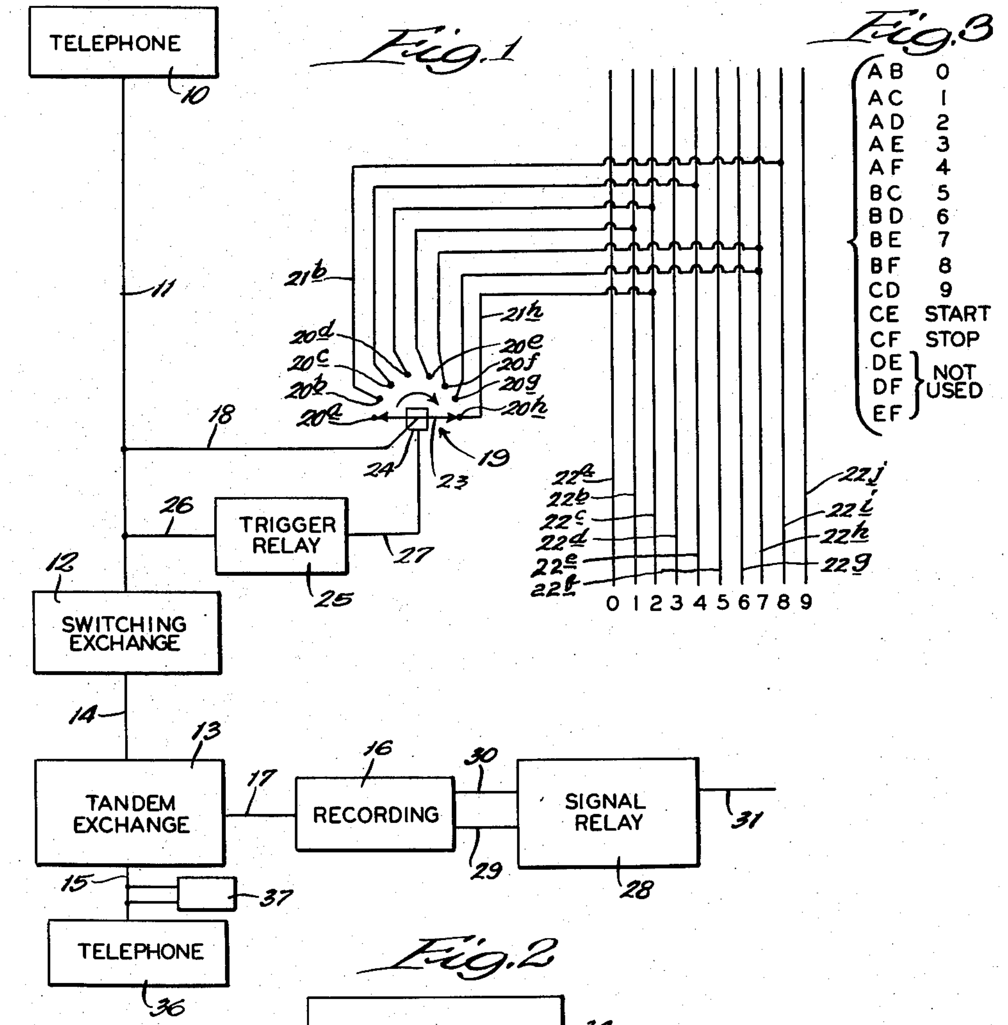

This invention relates to a system for identifying telephone lines, and more particularly to means for automatically identifying by its number a telephone from which a call is being placed.

It is exceedingly desirable in telephone systems to provide automatic means for recording calls placed by a subscriber and especially so where toll calls are dialed directly by the subscriber. It will be appreciated that the desirability and need for such a means is becoming greater with the advent of direct subscriber dialing of long-distance calls.

Equipment is now in existence for recording toll calls dialed by a subscriber, but the equipment and systems so far devised have serious limitations. One system called Automatic Ticketing is used in a few step-by-step exchanges; it produces a printed ticket that provides such information as is necessary for billing the toll calls. In this system, the calling phone is identified by means of a complicated system of cross-wiring of such complexity that it is economically infeasible to locate the automatic recording equipment elsewhere than in the same building as the calling subscriber's exchange.

A second type of system now in use is called Automatic Message Accounting and is generally employed only with cross-bar dial equipment. In this system a tape is punched with holes that are oriented to provide indicia representative of the subscriber's phone. The calling phone or line is identified by marking the path of the connections from the calling subscriber to the trunk that will be used for the call. This equipment is also extremely complex and does not lend itself to economical widespread use.

A third system known as Centralized Automatic Message Accounting is now being put in use in some large cities. This system is in use because in the larger cities it is desirable to promote a more efficient usage of the automatic recording equipment by centralizing the equipment in one or more offices (which are generally called tandem offices), and the Automatic Ticketing and Automatic Message Accounting systems are not economically adapted to such centralization. In this system provision is made for a dialed toll call to reach an operator who then questions the subscriber as to his number and, after receiving this information, key-pulses it into a register which records the subscriber's number on a tape.

This latter system while being workable is unsatisfactory for it requires the use of a large number of operators who must intercept the call, question the subscriber for his number and then key-pulse the number into suitable recording equipment. Moreover, for an operator to interrupt a call, ask the subscriber for his number and then key-pulse it into recording equipment requires a considerable amount of time and, during this time interval, a recording instrument is tied-up and is not free to accept and record the key-pulsing of other indicia. Thus a large number of recording instruments and their associated equipment are required in each tandem office. Such equipment is expensive and represents a considerable capital expenditure.

Another difficulty inherent in this system is that a subscriber, either through error or dishonesty, may give the operator a wrong number when asked by the operator for the number of the phone he is calling from.

It is accordingly an object of this invention to provide an identification system that will overcome the disadvantages, such as have been brought out above, of systems now known. Another object of the invention is to provide a system for automatically identifying the phone or line of a subscriber from which a toll call is being placed. Still another object is in providing a system for identifying and recording the number, or its equivalent, of a telephone from which a toll call is placed and wherein upon the dialing of a toll call a signal of predetermined and distinctive character, which may be called the questioning signal, is automatically returned through the same line connections and triggers the identification means associated with the calling line which then sends back through the same connections to the recording equipment the signals representing the calling number.

A further object of the invention is to provide a system for identifying a telephone from which a call is placed and which utilizes the equipment now available in telephone exchanges and which requires in addition only the simplest of equipment. Additional objects and advantages will appear as the specification proceeds.

An embodiment of the invention is illustrated in the accompanying drawing, in which—

Figure 2:
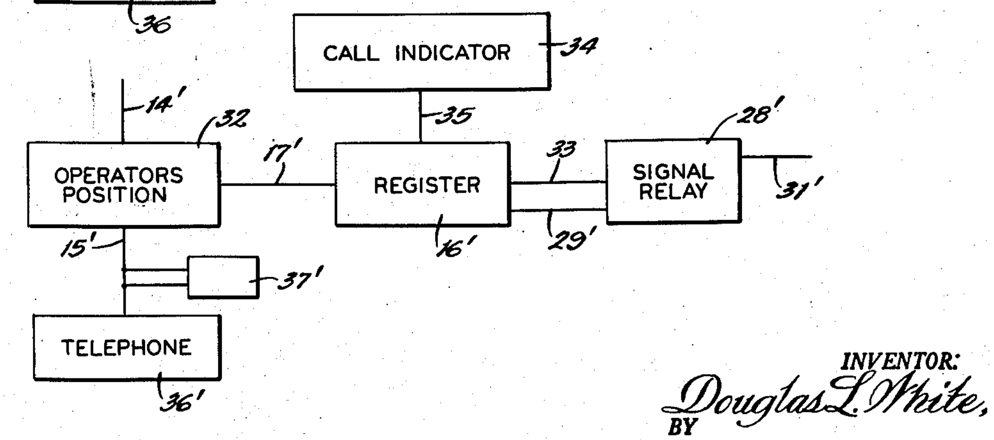

Figure 1 is a schematic diagram of a system embodying the invention; Fig. 2 is a partial schematic diagram showing a modification of the invention; and Fig. 3 is a chart showing the system of key-pulsing now in use in many of the telephone systems.

It should be appreciated that considerable change may be made in the details of the invention and especially as to the equipment necessary for carrying out the same. The drawings are illustrative of a system embodying the invention and it is believed that the particular arrangement illustrated is desirable for it utilizes substantially all of the equipment now in use by the telephone companies in many of the larger cities. The invention is readily adapted for use with Centralized Automatic Message Accounting systems found now in the larger cities, but can of course be used in other systems such as the Automatic Ticketing and Automatic Message Accounting systems, as well as with operator switchboards.

As has been briefly described before, in Centralized Automatic Message Accounting an operator is alerted when a toll call is dialed on a subscriber's telephone. The operator then breaks into the line and asks the person placing the call for his number. After she receives this information she transfers it to the recording apparatus by means of keying a plurality of pulses thereto, each pulse or combination of pulses being representative of a number or letter in the complete number of the calling subscriber's telephone. For example, if the subscriber placing a call has the phone number VI 2–1772 the operator keys each of these letters or numbers into the recording equipment. It will be apparent that though a combination of letters and numbers are used in the larger cities to identify subscribers' telephones, the letters are actually the same as certain of the numbers. For example, in a dial telephone the numeral 1 ordinarily has no complementary letters associated therewith. The number 2, however, has the letters A, B and C arranged therewith, and each of the subsequent numbers through 9 has three letters of the alphabet arranged therewith. The digit zero, however, has but a single letter, the letter Z, corresponding thereto. Thus, if the subscriber's telephone number is VI 2–1772, this is the same as 84 2–1772.

The system now in use for key-pulsing numbers to recording equipment involves the use of a combination of six distinct tones or signals. The first tone or signal may be designated A, for example, the second B, and so on through F. By combining these separate tones or signals in pairs, each of the digits from zero through 9 can be identified and there still remain five extra combinations some of which are not presently in use. By referring to Fig. 3 it is believed that this key-pulsing system will become clear. It is shown there that the combined signals A and B may represent zero, AC may represent 1, AD 2, and so on through CD which may represent or identify the numeral 9. For the operator to key-pulse the phone number VI 2–1772 into the recording equipment she would actuate the tone or signal pulses BF, AF, AD, and so forth. In Fig. 3 the combination CE is designated "start" while CF is designated "stop" and these combinations are now in use for purposes not pertinent to this invention. The combinations DE, DF and EF are not presently used.

Referring now to Fig. 1 in particular, a telephone system embodying my invention will be described in detail. A subscriber's telephone is designated with the numeral 10 and this telephone is connected by lines 11 to an exchange which may be referred to as a switching exchange and is designated with the number 12. It will be appreciated that in a large city a number of switching exchanges will be employed and there will also be a vast number of telephones all connected by separate lines to a single exchange. Since it is desirable to economize in the use of trunks, a few tandem exchanges 13 are located within an area having a plurality of switching exchange and tandem exchange may be connected by lines 14. Trunk lines 15 lead from the tandem exchange and carry the long-distance toll calls. These trunk lines run to various cities, etc., and to the exchanges located therein.

Recording equipment 16 is located at the tandem exchange and usually will be within the same building as the tandem exchange. In the illustration the lines 17 are simply employed to indicate that the tandem exchange or portions of the equipment therein is arranged with the recording equipment 16. Now when a toll call is dialed, an operator at the tandem exchange will ask the person placing the call for his phone number and will then key-pulse this information into the recording equipment 16. It is apparent that some means must be now used in the tandem exchanges for signaling or alerting the operators therein that a toll call is being placed.

Each of the tandem exchanges has now present a key-pulsing system as has been heretofore indicated, for it is by means of the key-pulses which are present at the exchange that the operator is able to record the number of the calling phone on the recording equipment. My invention contemplates the use of a key-pulsing system, and a typical system that may be used will now be described.

With each of the lines 11 connecting a subscriber's telephone to an exchange, I will connect through suitable lines or circuits 18 a switch that is designated generally with the numeral 19. The switch illustrated is simply intended to be exemplary of any number of switches or relays that might be employed to accomplish the results that will be subsequently described. Preferably the switch 19 is equipped with a plurality of contacts 20*a* through 20*h*. It will be apparent that lesser or greater numbers of contact positions may be provided as is required to accommodate the particular telephone systems or installations at any location. In the illustration given, it is assumed that the subscribers' telephone numbers will contain seven figures, either all numbers, or letters and numbers, etc. The contact 20*a* in the illustration given is dead and has nothing leading thereto. The remaining contacts are connected through lines or leads 21*b* through 21*h* to the key-pulse signals which are carried on the lines 22*a* through 22*j*. In this illustration it is assumed that the subscriber's telephone 10 is identified by the number VI 2–1772. Thus, the contact 20*b* is connected through line 21*b* to the line 22*i* which carries the key-pulses BF thereon which identify the number 8 and any of the letters T, U and V. The contact 20*c* is similarly connected through line 21*c* to the line 22*e* which carries the key-pulses AF thereon which represent the numeral 4 or letters G, H and I. In the same manner each of the remaining contacts is connected through lines to the apropriate key-pulse signal lines 22.

The switch 19 has a contact arm 23 which is preferably double-ended and in the illustration is designated as being rotatable in a clockwise direction. In its rotation, one of the contact ends sweeps across in succession each of the contact terminals 20*b* through 20*h* and, since the arm 23 is connected by line 18 to the telephone line 11, each of the key-pulses or key-pulse combinations present on the lines 22*a* through 22*j* which are connected to the contact terminals 20*a* through 20*h* is placed on the line 11. Thus in the specific example given, when the switch arm 23 rotates through 180° the key-pulses BF, AF, AD, etc., which represent the telephone number VI 2–1772 are in order placed upon the line 11.

Any means may be employed to selectively rotate the switch arm 23 so as to sweep the ends thereof over the contacts 20*a* through 20*h*. For example, the switch arm may be rotated by magnetic means as in a typical step-by-step switch, or by causing a geared wheel to make momentary contact with a continuously revolving element. The means for rotating the arm 23 through 180° to sweep it over all of the contacts is indicated generally by the numeral 24. Since switches of the character required are well known in the art, it is believed that a detailed showing and description thereof is unnecessary for purposes of adequately describing this invention.

It is desired that the key-pulses be placed upon the subscriber's telephone line 11 only when definite identification of the line is desired, either to record a dialed toll call, for use by an operator or test man, etc. This result will be accomplished by maintaining the switch 19 in a normally deenergized condition and by energizing the same only when it is desired to identify the telephone 10. I prefer to do this by incorporating a trigger means or relay 25 in circuit with the actuating means 24 for the switch 19. The trigger relay may be connected through lines 26 to the telephone line 11 and through line 27 to the energizing means 24. The specific arrangement is such that when the trigger relay 25 is energized upon receipt of a signal of predetermined character the relay is operative to energize the driving arrangement 24 for the switch blade 23. Preferably the trigger relay 25 is arranged so that it can be actuated only upon the receipt thereby of a single impulse or signal of predetermined character.

The trigger arrangement 25 may be actuated in the following manner. As has been heretofore stated, when a toll call is now dialed by a subscriber, means are provided in the tandem exchange for alerting an operator, who then questions the person placing the call for his number. This same means now used to alert an operator may be used to energize a relay 28 which when energized is capable of sending back to the trigger means or signal receiving means 25 a signal or tone having the predetermined characteristics that will bring about actuation of the trigger 25. Thus I prefer to arrange a relay 28 with the appropriate equipment in the tandem exchange and this is indicated in the drawing by the line 29 extending between the tandem exchange and recording equipment to the relay. The line used to carry the signal from the relay and back to the tandem exchange through the recording equipment is designated with the numeral 30. If desired, one of the key-pulse signals not now in use might be used to trigger the signal-sensitive relay 25. For example, a line 31 might lead to the relay 28 and this line carry the key-pulses DE. When the relay 28 is energized it would be operative to connect the lines 30 and 31 and the key-pulses DE would then be carried back through the tandem and switching exchanges and to the trigger relay 25. If the trigger relay were designed to be energized upon receipt of the pulses DE, the switching means or identification means 19 would then be energized.

*Operation*

In operation of this system, a toll call is placed on the telephone 10 and through the usual switching that takes place in the switching exchange the line 11 is connected by appropriate switches within the tandem exchange to the selected trunk line 15. This switching sequence causes an energizing impulse to travel through the line 29 and to the relay 28 which is then energized. The relay 28 then sends back through the same lines a questioning signal or tone to the trigger relay 25. The relay 25 is then energized and in turn energizes the switch blade or arm 23 which rotates through 180° and in sweeping over each of the contacts places each of the appropriate key-pulses upon the line 11. These key-pulses then travel over the subscriber's line 11 and through the same switching path within the switching exchange and tandem exchange and into the recording equipment 16 which is then energized and records the number of the calling telephone.

Thus in a telephone system there will be a switch or some comparable means that when energized is capable of placing identifying pulses upon the telephone lines arranged therewith. The only other equipment necessary would be the trigger relay means 25 and the questioning relay 28. All of the remaining equipment is now present in the telephone exchanges. Thus it is well known in the art and its functioning well understood.

In the modification shown in Fig. 2 the system functions in substantially the same manner. In this case the phone line 11 is connected through a switching exchange (not shown) and line 14′ to an operator's position or test-board position 32, which through the cable 17′ is connected with a register 16′. A questioning relay 28′ is connected to the register through a line 33 and a call indicator 34 is connected to the register 16′ through line 35. This modification shows the invention embodied in a telephone system in a way to indicate to an operator what number is placing a call. This modification may be employed at either the local office, or a long-distance office, or both. The operation, however, will be substantially the same as that described with reference to the embodiment shown in Fig. 1.

It will be appreciated that in place of a call indicator which presents visual indicia or intelligence to the operator, other means of presenting the intelligence or preserving it may be employed. For example, the information or intelligence may be printed on a tape so that the number of the calling phone will be preserved. Such printing systems are well known in the art and an embodiment thereof is the system of Automatic Ticketing heretofore referred to. The intelligence or number of the calling phone might also be given vocally to the operator by means of recorded voices. The use of recorded voices in dialing, etc., is also well known in the art.

All of the systems set out above, including the call indicator, are well known in the art and a detailed description of each is believed unnecessary for purposes of adequately understanding the present invention.

It should be understood that any definite scheme of pulsing might be adopted, but since the system of multi-frequency key-pulsing is now widely used it would appear advantageous to use this system and it has therefore been described in connection with the invention. The tones produced by the key-pulses are available in most all telephone exchanges and are in the audio frequency range. Therefore they can pass over any circuit however long without distortion.

Since the system described involves only the calling subscriber's telephone line and the equipment that "asks" for the subscriber's number or triggers the identification means, it is entirely independent of the type of dialing equipment used and will make possible the application of automatic recording to other types of dial systems such as the panel type and step-by-step type, etc.

The system should prove advantageous also in emergencies, since an operator will be able to get the number and automatically record the same of a calling telephone. This feature may also be advantageous in police work, etc., where it is desired to quickly trace and record the number of a calling telephone.

The system may be useful further in identifying the number of a telephone receiving a call. The questioning or trigger signal in such case will be sent forward to the lines of a called telephone after the circuit thereto is complete, and the identification means arranged with that telephone and its lines will be energized and the identification signals produced thereby will be returned rearwardly over the same circuit to the indicating equipment associated with the operator's position, etc. A telephone receiving a call is indicated diagrammatically in Figs. 1 and 2 connected to the trunk lines 15 and 15′ respectively. The telephones are designated with the numerals 36 and 36′. The called telephones each will have identification means arranged therewith as shown at 37 and 37′ respectively in Figs. 1 and 2. It should be understood that switching exchanges, etc., may be interposed in the trunk lines 15 and 15′ in actual practice but have not been illustrated for the sake of clarity.

While in the foregoing specification embodiments of the invention have been described in considerable detail for purposes of illustration, it will be apparent to those skilled in the art that these details may be varied considerably without departing from the spirit and principles of the invention.

I claim:

1. In a telephone system having an exchange, a plurality of telephones, individual lines connecting each of said telephones to said exchange, and recording equipment of said exchange and including mechanism actuated in response to the dialing of a toll call through said exchange from any of said telephones, a telephone identification system for automatically identifying a telephone from which a toll call is dialed and for recording identification indicia indicating the telephone from which a toll call is dialed, comprising telephone identification means for each of said lines and being operatively connected thereto, said identification means being operative to place telephone identification signals on the line arranged therewith, trigger means for selectively placing said identification means in operative condition, and signal means responsive to said recording equipment and being energized upon the actuation thereof, said signal means being operative to send a signal of predetermined character through said exchange and to said trigger means to actuate the same and thereby energize said identification means, said trigger means being responsive only to said signal of predetermined character.

2. The apparatus of claim 1 in which said identification means comprises switch means having a plurality of individual contact members, and a key pulse system connected with said switch, said key pulse system providing a plurality of distinctive signals each connected to one of said contact members, said contact members being arranged so that sequential contact therewith provides identification signals indicative of a telephone and line arranged therewith.

3. In a telephone system having a dial telephone, an exchange through which toll calls can be dialed from said telephone and a line connecting said telephone with said exchange, said exchange being equipped with a recording device operative to record information fed thereto, identification signal means connected to said line and operative when energized to place a plurality of signals on said line that are characteristic of the identification number of said telephone, a trigger device connected to said line for receiving signals therefrom and connected also to said identification signal means and being operative to energize the same when a signal of predetermined character is received by said trigger device from said line, and a questioning device connected to said recording device so as to be actuated thereby when the recording device is placed in operative condition by the dialing of a toll call through said exchange, said questioning device being operative to transmit through said exchange and through said line to said trigger device a signal of predetermined character to which said trigger device is responsive, whereby when a toll call is dialed from said telephone said questioning device is rendered operative and produces a signal of predetermined character for actuating said trigger device with the result that said identification signal means is energized and the signals placed on said line thereby are fed through said exchange to said recording device and are recorded thereby.

4. In combination with a telephone system having a toll call exchange and a subscriber's line connected thereto from which a toll call may be made through the exchange, a line identification arrangement comprising means providing a plurality of signals representative respectively of the various digits of the numerical designation of said line, switch means connecting said means with said line for placing each signal successively thereon in the sequence of the numerical designation, trigger means connected to said line and switch means for actuating the latter and being itself energized by receipt of a signal of predetermined character transmitted over said line, and signal transmitting means connected with said toll exchange and energized thereby when a toll call is made therethrough, said signal transmitting means being connected with said line for placing such an aforesaid predetermined signal thereon to energize said trigger means.

5. In combination with a telephone system having a toll exchange and a subscriber's line connected thereto from which a toll call can be made through the exchange, a line identification arrangement comprising means for developing a plurality of signals each representative of one of the digits in the numerical designation of said line, a normally open sequential switch means connecting said means for developing signals to said line, said switch means being operative to establish successive connections with said means to deliver the developed signals to said line in the succession representing the numerical designation of the line, trigger means connected with said line and said switch means for actuating the switch means, and normally deenergized signal transmission means connected to said line for transmitting a signal thereto of predetermined character, said trigger means being responsive to such signal of predetermined character transmitted by said signal transmission means, said signal transmission means being connected also to said toll exchange and being energized thereby when a toll call is made therethrough.

6. In a line identification system of the character described, a subscriber's line to be identified when a toll call is made therefrom, an exchange connected with said line and through which toll calls are made, said exchange being equipped with recording equipment actuated when a toll call is made through the exchange, normally deenergized signal transmission means connected to said recording equipment and to said line, said signal transmission means being energized when said recording equipment is energized and being operative to place on said line a signal of predetermined character, trigger means connected to said line and being responsive to such signal of predetermined character, normally open switch means connected to said line and to said trigger means and being actuated by the trigger means, and a signal source providing a plurality of distinctive signals each representative of one of the digits in the numerical designation of said line, said signal source being connected with said switch means and said switch means being operative to transmit the distinctive signals to said line successively in the sequence of the numerical designation of the line.

7. In a system of the character described, a plurality of signal lines each having a distinctive signal transmitted thereover representing respectively the digits in the numerical designations of subscribers' telephone lines, means for imposing such distinctive signals on said signal lines, an exchange through which toll calls are made, a subscriber's telephone line connected to said exchange and through which a toll call can be dialed, sequential switch means connected to said telephone line and to the signal lines carrying the signal representations of the digits of the numerical designation of said telephone line, said switch means being operative to connect said telephone line to the signal lines in the order of the numerical designation of the telephone line, trigger means for actuating said switch means and being connected to said telephone line for receipt of a triggering signal of predetermined character transmitted thereover, and a signal transmission means connected to said telephone line for transmitting thereover a triggering signal of such predetermined character, said signal transmission means including actuating mechanism therefor connected with said exchange and including actuating mechanism therefor energized when a toll call is made therethrough.

8. The system of claim 7 in which said exchange is provided with automatic recording equipment including mechanism therefor energized when a toll call is made through said exchange and operative to record the distinctive signals transmitted over said telephone line and representative of the numerical designation thereof.

9. In a telephone system having a switching exchange, a tandem exchange connected thereto through which toll calls are made, a subscriber's telephone line connected to said switching exchange, means for providing a plurality of signals representative respectively of the digits in a numerical designation of said telephone line, a switch connected to said telephone line and to said means for transmitting the distinctive signals to said telephone line in the order of the digits in the numerical designation thereof, trigger means connected to said telephone line and to said switch means for actuating the latter, and signal transmission means energized by said tandem exchange when a toll call is made therethrough and connected thereby through said switching exchange to said telephone line for delivering a triggering signal thereto of predetermined character, said trigger means being responsive to such a triggering signal of predetermined character for actuating said switch means, whereby signals representing the numerical designation of said telephone line are transmitted thereto only when a toll call is made therefrom.

10. In a telephone system having an exchange, a plurality of telephones and lines therefor connecting the same with said exchange, and recording equipment associated with said exchange and including mechanism actuated thereby in response to the dialing of a toll call through said exchange from any of said telephones, a telephone identification system for automatically identifying a telephone from which a toll call is dialed and for recording identification indicia representative of the telephone from which a toll call is dialed and comprising telephone identification means for each of said lines, signal means responsive to said recording equipment and being energized therewith, said signal means being operative to transmit an interrogating signal through said exchange and to such line from which a toll call is being dialed to energize said identification means, and means for transmitting telephone identification signals to said exchange and recording equipment as a result of the energization of said identification means by said interrogating signal.

References Cited in the file of this patent

UNITED STATES PATENTS

| | | |
|---|---|---|
| 1,308,539 | Clausen | July 1, 1919 |
| 2,532,750 | Baker | Dec. 5, 1950 |
| 2,547,804 | Baker | Apr. 3, 1951 |
| 2,591,909 | Baker | Apr. 8, 1952 |
| 2,615,987 | Gooderham | Mar. 16, 1954 |
| 2,672,518 | Holden et al. | Mar. 16, 1954 |
| 2,672,519 | Baker et al. | Mar. 16, 1954 |